United States Patent [19]
Kamlukin

[11] Patent Number: 5,692,989
[45] Date of Patent: Dec. 2, 1997

[54] SELF ALIGNING PLANETARY GEAR TRANSMISSION & SPEED REDUCER

[76] Inventor: Igor Kamlukin, 11506 N. Shorecliff La., Mequon, Wis. 53092

[21] Appl. No.: 659,410

[22] Filed: Jun. 6, 1996

[51] Int. Cl.$^6$ .................................................. F16H 57/08
[52] U.S. Cl. ............................................. 475/346; 475/338
[58] Field of Search ................................. 475/346, 338, 475/339

[56] References Cited

U.S. PATENT DOCUMENTS

| | | | |
|---|---|---|---|
| 3,774,477 | 11/1973 | Murphy | 475/331 X |
| 4,092,878 | 6/1978 | Campbell | 475/346 X |
| 4,926,715 | 5/1990 | Hirt et al. | 475/346 X |
| 5,221,237 | 6/1993 | Weber | 475/331 X |
| 5,269,734 | 12/1993 | Menge, Sr. | 475/339 |
| 5,328,419 | 7/1994 | Motl et al. | 475/338 X |
| 5,385,514 | 1/1995 | Dawe | 475/338 X |
| 5,472,387 | 12/1995 | Kamlukin | 475/346 X |

Primary Examiner—Charles A. Marmor
Assistant Examiner—Peter T. Kwon
Attorney, Agent, or Firm—Robert B. Benson

[57] ABSTRACT

This invention relates to high reduction planetary transmissions that do not use internal ring gears and particularly planet gears that are the support for the planet carrier and in some cases the planet carrier may be used as a support bearing for the input shaft relative to the stationary and output gears with which they mesh. The floating is accomplished by providing means to let the carrier move radially in response to unbalanced forces from the planet gears. The floating of the planet gears improves the alignment between the intermeshing gears and the balancing of the load between the planet gears. A speed reducing device placed between the input shaft of the transmission and the drive means is used to decrease the speed of the input shaft to decrease the centrifugal force on the planetary pinions as they rotate around the sun and output gears.

3 Claims, 2 Drawing Sheets

SELF ALIGNING PLANETARY GEAR TRANSMISSION & SPEED REDUCER

BACKGROUND OF THE INVENTION

This invention relates to a differential power transmission often referred to as a planetary transmission of the type where the planetary gears radially outward movement is restrained by a planet carrier rather than a ring gear formed within the transmission housing. In general, such transmissions comprise rotatable shafts mounted in axial alignment with one being power driven and the other an output shaft. It also includes planetary shafts radially spaced from the input shaft and driven by a carrier attached to the input power shaft. Gears or pinions are mounted on the planetary shafts and positioned to mesh with a stationary sun gear and a gear mounted on the output shaft. Such transmissions are capable of producing speed differentials of up to 300 to 1 and higher.

In planetary transmissions of the type described above having high torque output loads and high rotational speeds of the planet carrier assembly, the bearings of the planetary gears are subjected to very high centrifugal loads that would significantly reduce bearing life. Reducing the speed of the planetary carrier assembly would reduce centrifugal forces and result in a more economical assembly.

U.S. Pat. No. 5,472,387 describes a planetary transmission whereby the planet carrier can move in a radial direction thus enabling the planet gears to serf align themselves with the gear they engage. This results in a more accurate alignment between the gears which reduces wear on the gears. In addition, it enables the planetary gears to more equally share the load being transmitted. This transmission reduces the cost of manufacturing by broadening manufacturing gear tolerances, angular pinion gear spacing tolerance.

However, it has been found that when the transmission of the type described in U.S. Pat. No. 5,472,387 is designed to handle large output forces the centrifugal force generated by the planets as they rotate around the sun are very large and effect the life of the bearings on the planets. For example, to provide a 2700 to 1 speed reduction from a ½ horsepower motor rotating at 1700 RPM would require planetary pinions weighing about seven pounds which would generate a centrifugal force of 3,300 pounds which significantly reduces bearing life.

This invention solves the problems of the prior art transmission described above by providing a speed reducing mechanism between the motor shaft and the input shaft of the transmission. For example, by using a 12.5 to 1 gear reducer between the drive motor and the planetary transmissions centrifugal forces acting on the planetary pinion bearing can be reduced from 3300 pounds to 254.

OBJECTIVES OF INVENTION

The object of this invention is to provide a new and improved transmission using a compound planetary transmission that is capable of higher speed differentials while driving larger loads.

Another object of the invention is to provide a planetary gear transmission in combination with a speed reducer that is capable of higher speed reduction and/or larger output loads.

DESCRIPTION OF THE PREFERRED EMBODIMENT

Figure 1:
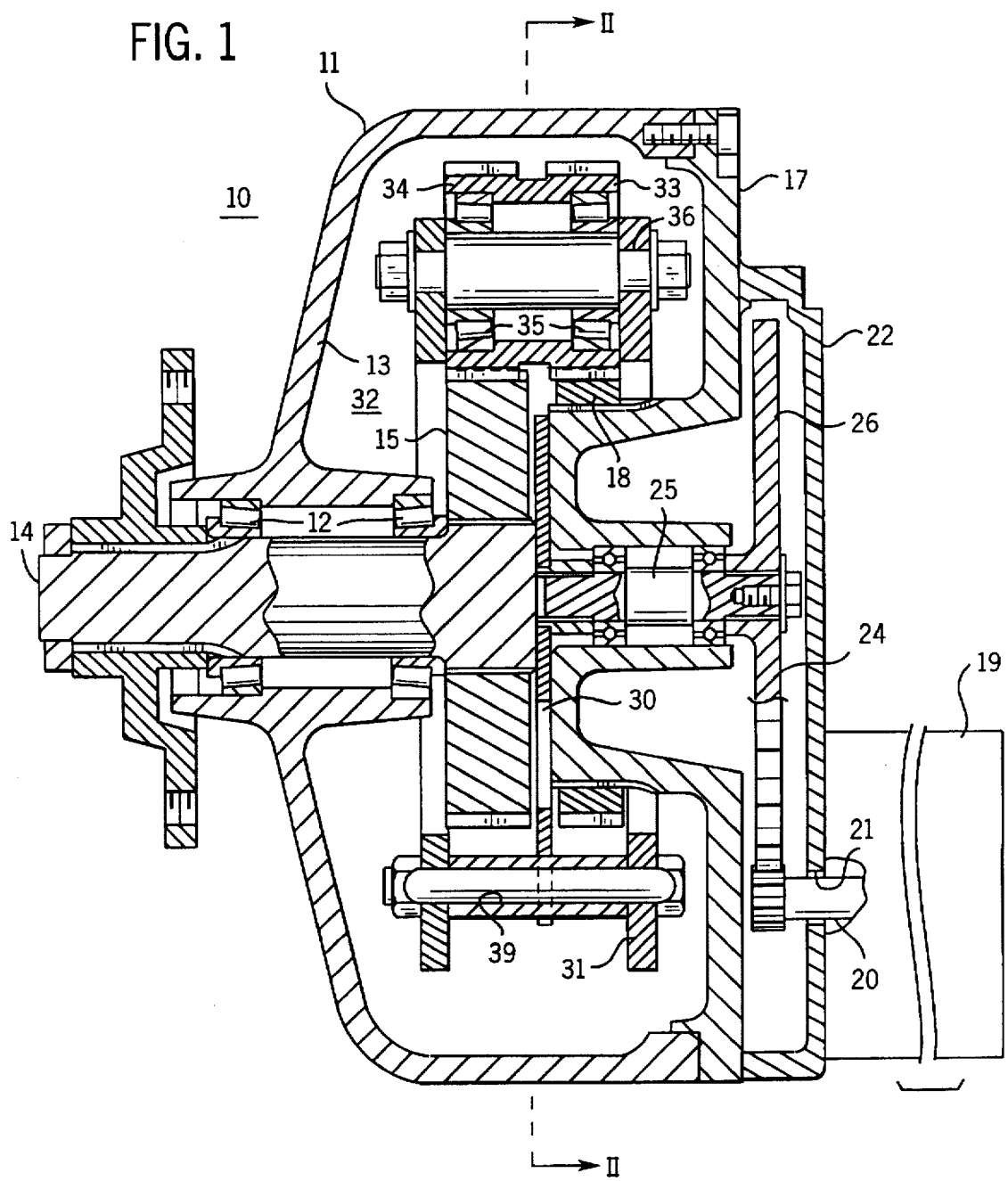
FIG. 1 is longitudinal sectional on an axial vertical plane through a planetary gear transmission embodying the present invention.
Figure 2:
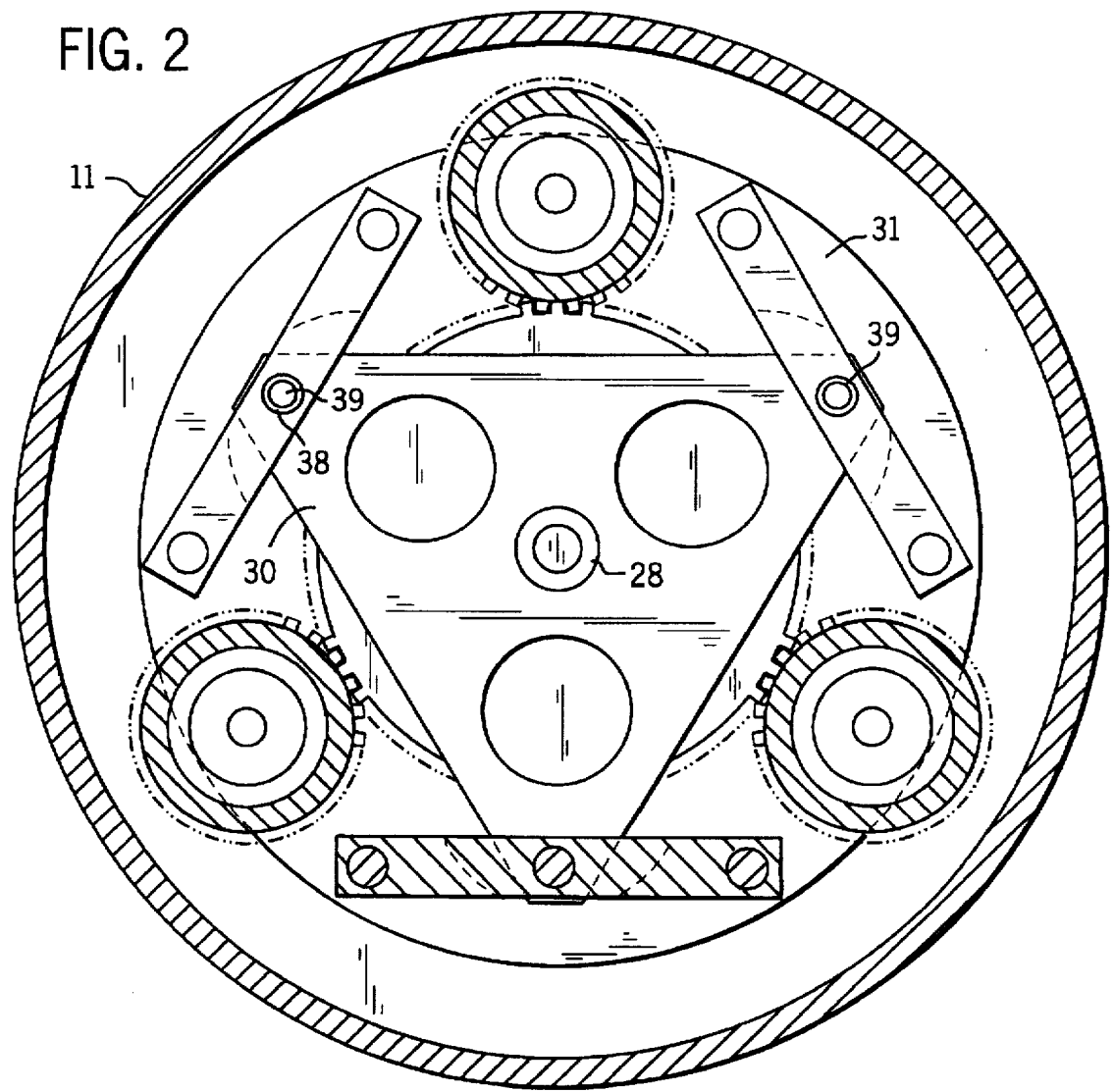
FIG. 2 is a cross section view taken along the line II—II of FIG. 1.

In the preferred embodiment of this invention, as shown in FIGS. 1 and II, a transmission housing 10 consists of cup shaped member 11 having bearings 12 mounted in wall 13 for supporting an output shaft 14 on which is mounted an output gear 15. The output gear is positioned within the cup shaped member 11. A disk shaped cover 17 is positioned to connect with member 11 forming an enclosure to house the planet gear transmission. A sun gear 18 is attached to the inside of cover 17. A power source such as electric motor 19 has a drive shaft 20 which extends through an opening 21 in a plate 22 connected to the cover 17. A speed reducer 24 is inserted between the drive shaft 20 of the motor 19 and the input shaft 25 of the planetary transmission. The speed reducer can be of any conventional type such as a fluid motor or a two gear reducer capable of reducing the speed of the motor shaft 20 from 1700 RPM to 136 RPM at the output gear 26 of the speed reducer 24. A shaft 28 extends from the output gear 26 of the speed reducer through the bore 29 of the sun gear 18 and is connected to the drive plate 30 that rotates the planet carrier.

A planetary carrier assembly 32 consists of planet gears or pinions 33 and 34 which are connected together for rotation on bearings 35 around planet shafts 36 supported by planet carriers 31. Planet gears 33 are positioned to mesh with sun gear 18 and planet gears 34 are positioned to mesh with output gear 15. The planet carrier 32 has drive pins 39 which extend from the planet carriers and through the drive plate 30. The drive plate 30 is keyed to the inner end of the output shaft 25 of the gear reducer to rotate therewith.

The drive plate 30 is positioned between the sun gear 18 and the output gear 15 and extends radially from the shaft 25, and has openings or slots shown as bores 38 near its periphery that fit loosely over and engage the drive pins 39 extending from planet carriers. This enables the carrier assembly 32 to slide radially relative to the drive plate 30 in response to forces on the planet gears as they rotate around the sun 18 and output 15 gears.

Planetary assembly 32 has 3 sets of planet duster gears 33 and 34 meshing with output and sun gears 15, 18. As the planet carrier assembly 32 is rotated by the drive plate 30, the planet cluster gears 33, 34 seek their center of rotation to equalize the torque load from the drive plate 30. The center of rotation of the planet carrier assembly 32 may not exactly coincide with the center line of the drive plate 30 but the drive pins 39 and planet assembly 32 are free to slide radially relative to drive plate 30; thus allowing the planet assembly to balance the load between the three sets of planet cluster gears.

In operation the motor 19 engages and drives the speed reducer 24 to reduce the speed of the motor shaft from approximately 1700 RPM to 136 RPM at the output of the speed reducer. The output shaft 25 of the speed reducer is connected to the drive plate 30 which engages the drive pins 39 to rotate the planet carrier assembly 32. The planet dusters are trapped within the carrier 31 and are caused to rotate as the planet is rotated around the sun gear 18. If the gear ratios of the sun/planet and output/plant were the same, rotating the cluster around the output gear would cause it to remain stationary. If the ratios were not the same, the output gear would rotate. The smaller the difference in ratios the greater the speed reduction rate.

Although the above described planetary drive has three sets of planetary gears, the invention equally applies to planetary drives in which the planet carrier has only two planet sets that are equally arcuately spaced around the carrier.

The embodiments of the invention in which an exclusive property or privilege is claimed are defined as follows:

1. a planetary power transmission in combination with a speed reducer comprising;

a stationary housing;

a drive shaft extending into said housing;

a stationary gear having external teeth surrounding said drive shaft and fixed to said housing;

an output shaft extending into said housing opposite to and a axially aligned with said input shaft;

an output gear mounted on said output shaft;

a planet carrier having at least two equally arcuately spaced planet shafts extending therefrom; first planet gears rotatably mounted on said planet shafts and positioned to mesh with said stationary gear;

second planetary gears rotatably mounted on said planetary shaft and positioned to mesh with said output gear;

said planetary gears being coupled to rotate together;

a radially extending drive plate mounted on the inward end of said drive shaft for rotation therewith and having opening near its radially outward ends;

pins attached to said carrier and extending into said openings in said drive plate to rotate said carrier with said drive shaft, said pins being in a loose fitting relationship with said drive plate to allow radial movement or said pins and said carrier relative to said drive plate;

a power source;

a speed reduction mechanism positioned between the output shaft of said power source and said transmission drive shaft.

2. The combination of claim 1 in which said speed reduction mechanism is a gear reducer.

3. The combination of claim 1 in which the openings in said drive plate are radially extending slots.

\* \* \* \* \*